June 17, 1947.　　　A. K. STEVENS　　　2,422,595
ANTISKID DEVICE
Filed April 25, 1946　　　2 Sheets-Sheet 1

INVENTOR.
Adolph K. Stevens,
BY Parker, Crochnor & Farmer,
Attorneys.

June 17, 1947.   A. K. STEVENS   2,422,595
ANTISKID DEVICE
Filed April 25, 1946   2 Sheets-Sheet 2

INVENTOR.
Adolph K. Stevens,
BY
Parker, Crochnor & Farmer,
Attorneys.

Patented June 17, 1947

2,422,595

UNITED STATES PATENT OFFICE 2,422,595

ANTISKID DEVICE

Adolph K. Stevens, Buffalo, N. Y.

Application April 25, 1946, Serial No. 664,898

4 Claims. (Cl. 152—241)

This invention relates to traction increasing attachments for vehicle wheels, which are particularly useful in connection with the wheels of trucks and passenger automobiles to increase the traction on ice, in snow and in soft ground.

An object of the invention is to provide an improved traction increasing device which may be applied to existing types of vehicle wheels including those having pneumatic tires, without structural changes in those wheels; with which traction in those wheels on ice and snow and in soft ground may be very materially increased; which will cause a minimum of bumping in the vehicle when wheels equipped with such devices are operated; which will have exceptionally long life when running on hard and bare pavements or roadways; which will snugly fit the periphery of the wheel so as to avoid flopping; which may be easily applied to or detached from a wheel without the use of tools; with which the cross straps may be easily and individually attached and detached so as to be renewed individually from time to time; and which will be relatively simple, attractive in appearance, effective in action and inexpensive.

Other objects and advantages will be apparent from the following description of one embodiment of the invention, and the novel features will be particularly pointed out hereinafter in connection with the appended claims.

Figure 1:
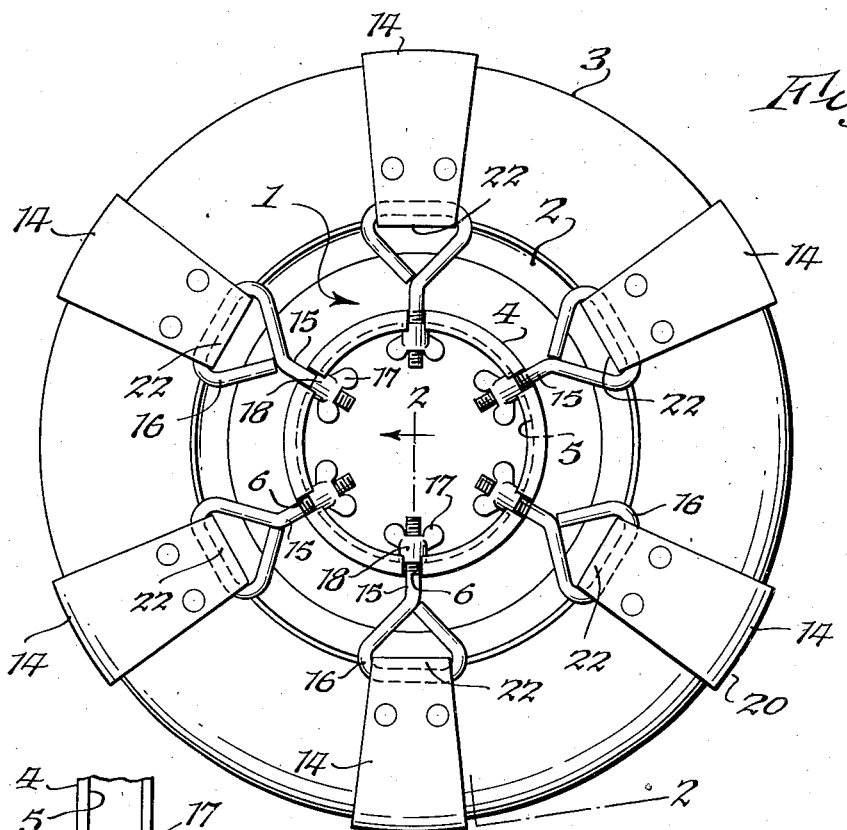
Fig. 1 is a side elevation of the outside face of a vehicle wheel having applied thereto a traction device constructed in accordance with this invention.
Figure 2:
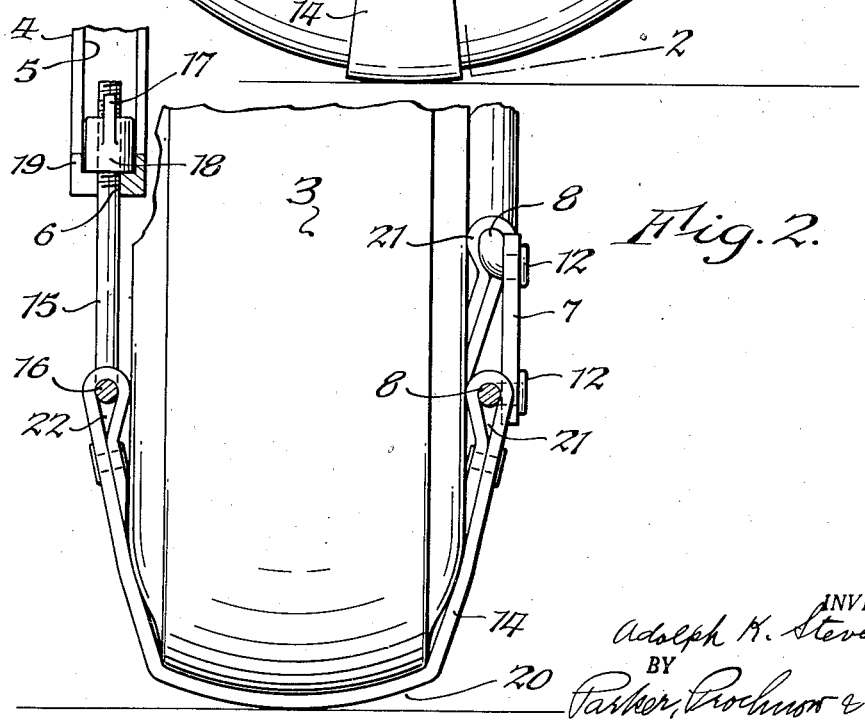
Fig. 2 is a sectional elevation of a part of the same, the section being taken approximately along the line 2—2 of Fig. 1, but with the tire of the wheel unsectioned.
Figure 3:
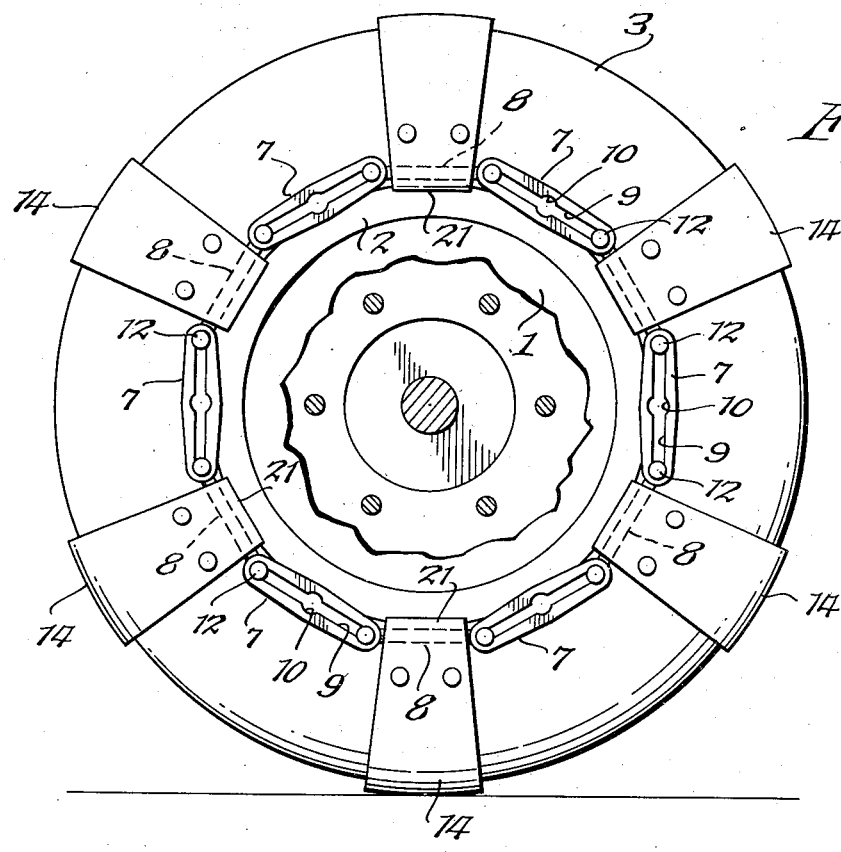
Fig. 3 is a side elevation of the inside face of the same wheel.

In the illustrated embodiment of the invention the vehicle wheel may be of any suitable type such as a wheel 1 having a rim 2 that detachably mounts a pneumatic tire 3, as usual in trucks and passenger automobiles. Disposed alongside the exterior face of the wheel is an annular member or ring 4 of rigid material, such as metal, and a diameter less than the diameter of the wheel, which ring has an inwardly facing channel groove 5 that corresponds to a groove in the ring along its inner periphery and opening toward the center of the ring. The outer peripheral wall of the ring 4, which corresponds to the bottom wall of the channel, is provided with a plurality of apertures 6 spaced apart at intervals around the periphery of the ring. These apertures 6 have diameters less than the crosswise width of the channel 5, as shown in Fig. 2.

Disposed along the inside face of the wheel is a ring or member formed of a plurality of articulately connected links 7 and 8. Alternate links 7 are preferably formed of flat metal, and each has an aperture 9 from face to face thereof which is elongated lengthwise of that link from approximately one end to approximately the other end, which aperture is in effect a slot in the link. This slot is preferably of uniform width from end to end except for a wider section 10 intermediate of its ends, preferably midway of the ends of the links.

Figure 5:
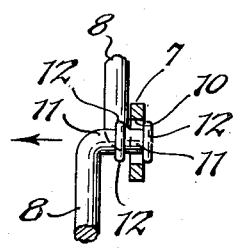
Fig. 5 is a section of the same, the section being taken approximately along the line 5—5 of Fig. 4.

The other and alternate links 8 have, at their ends, laterally extending pins 11, and the outer end of each pin carries a flange or head 12 which has a diameter less than the width of the wider section 10 of each slot or aperture 9, but greater than the width of the end portions of the slot or aperture 9, so that when the flange or head 12 is aligned with the wider section 10 of any link 7, it may pass through the aperture or slot 9 as shown in Fig. 5, to couple or uncouple those links, but when the pin 11 is in either end of the slot 9 of a link 7, the head 12 will prevent its disengagement from that link 7. The pin 11, of course, has a diameter such that it will pass freely along the slot or aperture 9 from end to end.

Preferably the links 8 are formed of rods with their ends bent laterally to form the pins 11, and in that event the bent ends forming the pins 11 terminate in the collars or flanges 12. In the arrangement shown, the links 7 are interposed between the links 8, with the pins 11 on the ends of the links engaged in the ends of the adjacent links 8 so as to form an articulate connection between adjoining links and thereby a closed ring or member which has a diameter less than the outside diameter of the tire.

A plurality of cross members 14 extend transversely across the periphery of the wheel or tire 3 at spaced intervals, and the ends of these cross members 14 on the inside face of the wheel are connected to the links 8, and the other ends of the cross members 14 are connected to the ring 4 in a manner which will now be described.

Passing through each aperture 6 in the ring 4 is a threaded rod 15. The outer end of each rod 15 is provided with a loop 16, such as by having the end bent into a loop, and the adjacent end of a cross member 14 is fastened to this loop. The inner end of each rod 15 is threaded and carries a wing nut 17 which engages against the open channel face of the ring 4. Each wing nut 17 has a cylindrical end portion 18, see Fig. 2, which has a diameter less than the width of the channel 5, so that it will be received within the channel 5 and be rotatable therein. Thus by turning each wing nut 17 to thread it further along the rod 15, it will tighten the connected cross member 14 upon the periphery of the tire 3.

In order to facilitate the engagement and disengagement of any rod 15 with the ring 4, the outside wall of the channel 5 is provided with a slot 19 which has a width, measured in a direction peripherally of the ring 4, less than the width of the channel 5 and approximately equal to the diameter of the aperture 6, so that the rod 15 may be passed sidewise through the slot 19 into the aperture 6 of ring 4, when the cylindrical end 18 of nut 17 is disengaged from the channel 5. When the cylindrical end 18 of a nut 17 is engaged in the channel 5, it prevents movement of the attached rod 15 sidewise out of engagement with the ring 4.

The cross members 14 are preferably formed of flat, flexible material, such as flat strips of rubber or rubber compositions, such as the material of which tires are commonly made, and these cross members or elements may have in their outside faces 20, which correspond with the tread surface, buttons or other devices or materials for increasing the traction on the pavement. For example, these cross elements may have in their pavement engaging surfaces, embedded fabric or metal, or both, to increase the traction, or they may be otherwise formed in order to increase the traction. These cross elements, when formed of this flat, flexible material, may have their ends formed into loops 21 and 22, the loops 21 receiving the links 8, and the loops 22 receiving the loops 16 of the rods 15.

Figure 4:
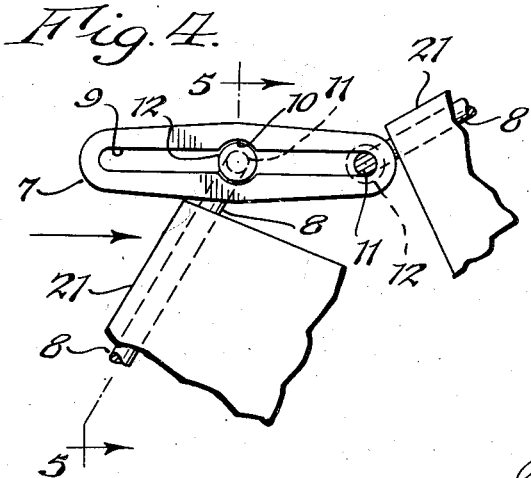
Fig. 4 is an elevation of a few of the links illustrating the manner in which they are manipulated to couple or uncouple them.

In applying the device to a vehicle wheel, such as an automobile or truck tire, the rods 15 are disconnected from the ring 4, and the ring member formed of the connected links 7 and 8 opened at one point by passing the end of one link 8 along the slot 9 of a link 7 connected thereto, until the head 12 is in alignment with the wide section 10 of that link 7, as shown in Figs. 4 and 5. That link 8 is then moved laterally away from link 7 during which the head 12 passes through the wide section 10 of the slot 9. This opened ring member formed of the links 7 and 8 is then passed around the axle of that wheel and the ends recoupled by re-passing the disengaged pin 11 through the wide section 10 of the link 7 from which it had been disconnected, and then when the re-engaged pin 11 is moved along the slot 9, it locks the links 7 and 8 together with a hinge connection between adjacent ends of links 7 and 8.

The cross straps or members 14 are next passed over the periphery of the tire 3 to the outer face of the wheel, and then two of the rods 15 at diametrically opposite sides are coupled to the ring 4 by passing the rods 15 laterally through the slots 19 into the apertures 6. The subsequent tightening of the wing nuts 17 tightens the two, opposed cross members 14 and holds the ring 4 in position. The other cross members 14 are then similarly connected to the ring 4. When the cross members are tightened, the rods 15 cannot be disengaged from the ring 4, because the cylindrical ends 18 of the nuts 17, by their engagement in the channel 5, are too large to pass through the slot 19, yet the nuts are free to rotate in tightening or loosening the cross members attached thereto. Thus, this traction increasing device may be applied to a wheel and when applied will be taut thereon, so that it will not rattle or flop while the wheel rolls on the pavement.

The flat, flexible cross strips 14 will not produce such abrupt bumps or shocks in the vehicle as are caused when the cross members are chains, and when formed of the same material as the tires, or of similar flexible materials, they will be relatively quiet in striking the pavement. If the wheel rolls upon a soft runway such as in mud, sand or snow, these cross members will bite into the soft surface of the roadway and give increased traction, just as effectively as will cross chains. If the pavement engaging surfaces of these cross members carry embedded buttons or plugs, or any other material which will give added traction on ice or slippery pavements, then that property will be fully effective as the cross members engage the pavement.

Since the cross members are preferably formed of the same material as tires are made of, they will wear well for long periods of time, even when operating on bare pavements, and thus it is not necessary to remove and apply these traction increasing appliances as one meets alternately sections of bare pavement and slippery or snow covered pavements, or even soft roadways.

These devices may be easily removed by loosening the nuts 17 until the rods 15 can be passed through the slots 6 and disengaged from ring 4, and then the inner ring member can be broken by shifting a link 8 into the position shown in Fig. 4 for disengagement from a link 7. If any cross member 14 wears out or becomes broken, it can be easily replaced by merely disconnecting the link 8 to which it is attached from adjacent link 7 as shown in Fig. 4, and then the rod 15 to which that cross member is attached may be individually detached from ring 4. After a new cross member 14 has been attached to this removed link 8 and the removed rod 15, the link 8 may be recoupled to the other links, and the rod 15 again connected to the ring 4.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. In a traction-increasing device for a vehicle wheel, the combination of two separate rings, each of smaller diameter than the diameter of said wheel and entirely separate from the wheel, one ring having a coupling therein by which it may be opened to pass around the axle of the wheel, and then be recoupled at the inside face of the wheel, the other of said rings having a channel in its inner periphery with spaced notches in the one wall of the channel leading into said channel, a plurality of flexible cross members attached to said one ring at spaced intervals therealong, extending crosswise over the periphery of the wheel and terminating in threaded rods passing through said channel, each rod having a diameter smaller than the width of the notch so as to pass laterally into the ring channel, and a nut on each of said threaded rods having an end rotatable in said channel but too large to pass through any of said notches, whereby any cross member may be tightened and loosened over the periphery of the wheel by turning the nut on the rod of that member, and detached from the channel ring, after the nut is loosened, by passing the rod through its related notch.

2. In a traction-increasing attachment for a vehicle wheel, of the type having two separate, closed loop members each of smaller diameter across the loops than the diameter of said wheel, and entirely separate from the wheel, and a plurality of cross elements connecting the members at spaced intervals along said members, that improvement in one of said members, which comprises adjacent links articulately connected end to end to complete or open the loop as those links are coupled or uncoupled, alternate links being strips of flat metal, each having an aperture from face to face and extending from adjacent one end approximately to the other end and having intermediate of its ends a section of greater width than the end sections, the other links being formed of rods having the ends bent laterally to form pins, and the pins having external peripheral flanges spaced apart along the pin, each outer end flange having a diameter less than the width of the aperture of said wider section but greater than the width of the aperture at the end portions, whereby the links may be coupled and uncoupled at any point by contracting the loop until the pin on any of said other links is aligned with the wider section of the aperture in the flat metal link in which it is engaged, and then moving the pin endwise out of the aperture.

3. In a traction-increasing attachment for a vehicle wheel, of the type having two separate, closed loop members each of smaller diameter across the loops than the diameter of said wheel, and entirely separate from the wheel, and a plurality of cross elements connecting the members at spaced intervals along said members, that improvement in one of said members, which comprises adjacent links articulately connected end to end to complete or open the loop as those links are coupled or uncoupled, alternate plates being strips of flat metal, each having an aperture from face to face and extending from adjacent one end approximately to the other end and having intermediate of its ends a section of greater width than the end sections, the other links being formed of rods having the ends bent laterally to form pins, and the pins having external peripheral flanges spaced apart along the pin, each outer end flange having a diameter less than the width of the aperture at said wider section but greater than the width of the aperture at the end portions, whereby the links may be coupled and uncoupled at any point by contracting the loop until the pin on any of said other links is aligned with the wider section of the aperture in a flat metal link in which it is engaged, and then moving the pin endwise out of the aperture, said cross elements having loops at corresponding ends through which said rods extend and by which the cross elements are secured to said one of said members.

4. In a traction-increasing attachment for a vehicle wheel, of the type having two separate, closed loop members each of smaller diameter across the loops than the diameter of said wheel, and entirely separate from the wheel, and a plurality of cross elements connecting the members at spaced intervals along said members, that improvement in one of said members, which comprises an annular ring, U-shaped in a transverse cross section with the base of the U forming the outer periphery of that member, apertures in the bottom of the channel at intervals along the ring, and each of a width in a direction peripherally of the ring substantially less than the crosswise width of the channel, a threaded rod passing through each aperture in a direction radially of the ring and having a loop at its outer end for attachment to one of the cross elements, a nut threaded on the inner end of the rod within the ring and having on the end face engaging in the channel, a cylindrical portion of greater diameter than the aperture through which the threaded rod passes, but less than the width of the channel, whereby the nut may be rotated while its cylindrical portion remains in the channel, said ring having notches in a side wall leading to each aperture and of the same width as the diameter of the apertures, whereby each threaded rod may be passed into its aperture in a direction laterally of the ring and held against disengagement by the engagement of the cylindrical end of the nut in the channel.

ADOLPH K. STEVENS.

REFERENCES CITED

The following references are of record in the file of this patent:

UNITED STATES PATENTS

| Number | Name | Date |
|---|---|---|
| 2,083,903 | Fitzgerald | June 15, 1937 |
| 1,414,638 | Grove | May 2, 1922 |